Sept. 19, 1939.  A. P. DE SEVERSKY  2,173,273
AIRCRAFT STRUCTURE
Filed Nov. 13, 1937  2 Sheets-Sheet 1
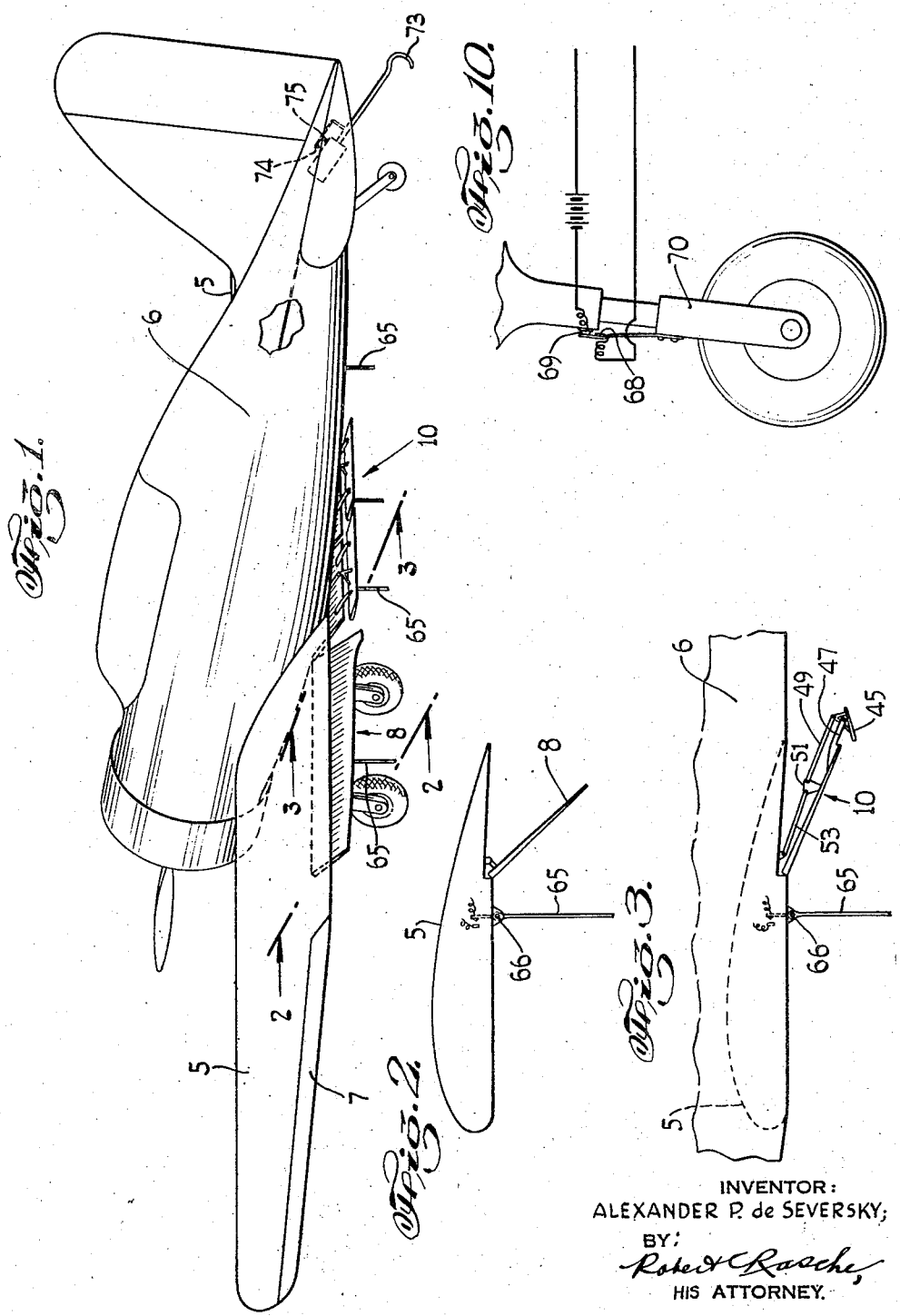
INVENTOR:
ALEXANDER P. de SEVERSKY;
BY:
Robert Rasche,
HIS ATTORNEY.

Sept. 19, 1939.  A. P. DE SEVERSKY  2,173,273
AIRCRAFT STRUCTURE
Filed Nov. 13, 1937    2 Sheets-Sheet 2
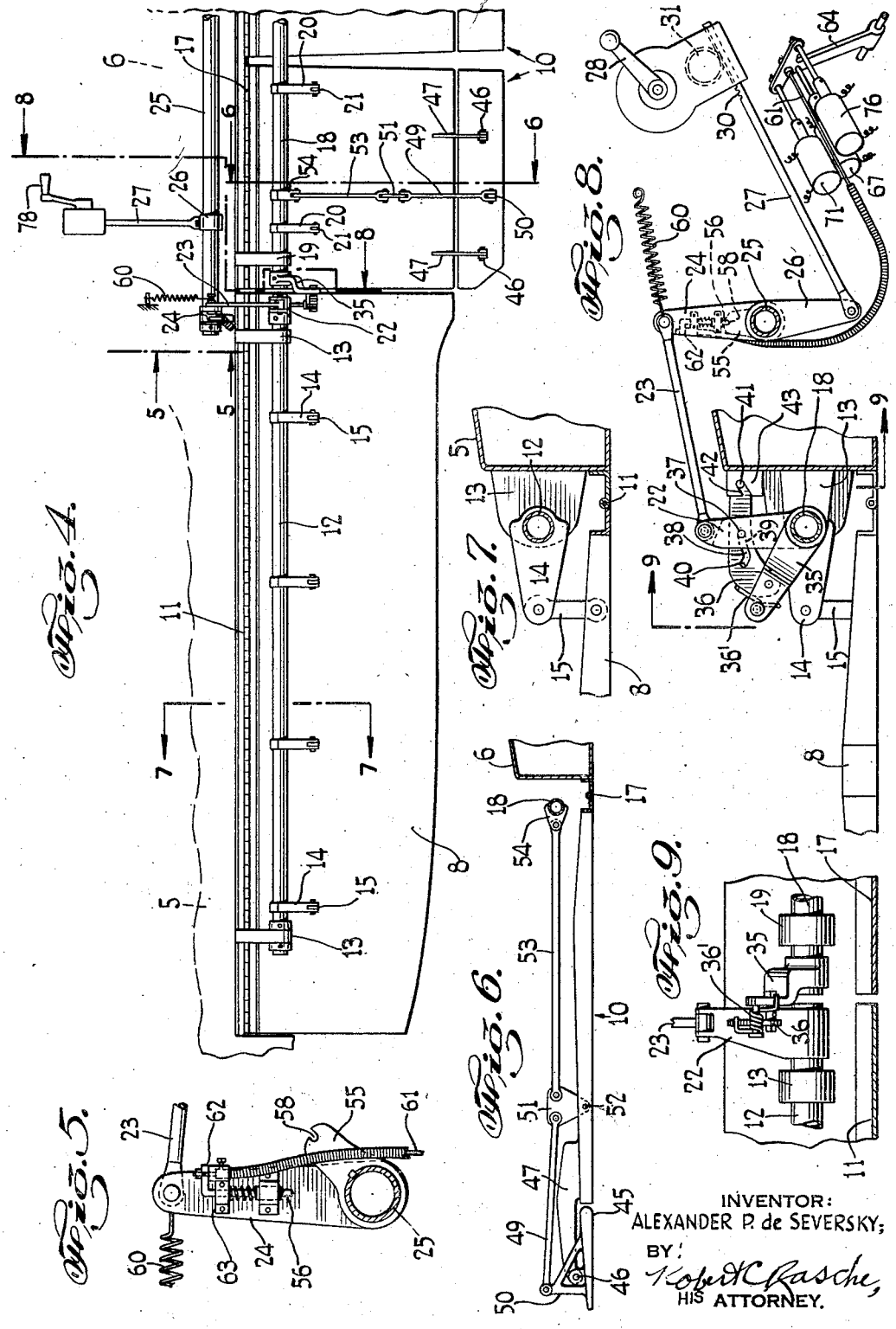
INVENTOR:
ALEXANDER P. de SEVERSKY;
BY
Robert C Rasche
HIS ATTORNEY.

Patented Sept. 19, 1939

2,173,273

UNITED STATES PATENT OFFICE 2,173,273

AIRCRAFT STRUCTURE

Alexander P. de Seversky, Northport, N. Y., assignor to Seversky Aircraft Corporation, a corporation of Delaware Application November 13, 1937, Serial No. 174,334

2 Claims. (Cl. 244—42)

The present invention relates to aircraft and has for an object to provide improved means for intensifying at will, the lift of the wings when flying at low speeds, especially under the conditions of taking off and landing.

The invention aims also to provide an arrangement for increasing the drag when landing and furthermore to make provision for automatically controlling the drag producing elements to avoid damage thereto when landing.

One of the problems in the construction and use of airplanes, particularly high speed airplanes, is concerned with obtaining the necessary lift at the low speeds of taking off and landing. For obvious reasons, it is desirable to be able to rise and land an airplane at as low a speed as possible. However, there is the serious difficulty when landing that if the pilot attempts to reduce the speed of the craft below a certain minimum depending upon the design and size of the wings as compared with the weight of the craft, the lift of the wings is insufficient to sustain the craft. Within certain limits, the lift of the wings can be increased by merely increasing the angle of attack, but when the angle exceeds a certain limit depending upon the design, the lift of the wing decreases very rapidly and stalls, due to turbulence of the air above the wing. This angle varies from 12 to 20 degrees, depending upon whether or not the flap is used and on what type of airfoil is used.

Furthermore, when landing there is a limit to the reduction of speed of travel on the ground that is safely obtainable by brakes operating on the wheels of the landing gear. It is desirable, therefore, to provide an increase of wing lift without a proportionate increase of drag, in order to thereby sustain the airplane at lower airspeeds and enable landing at lower speeds, while, at the same time, by virtue of the somewhat increased drag, increasing the steepness of the gliding angle to enable the airplane to reach the ground in a shorter distance from a given altitude.

Such increase of wing resistance is obtained according to the present invention, by providing a wing structure having airfoils or flaps arranged at the trailing edge of the wing structure adapted to flex downwardly under control of the pilot to increase the camber of the lower surface of the wings. The present invention also provides means for protecting such airfoils or flaps from damage by contact with the ground or otherwise. This feature of the invention is especially useful when applied to low wing monoplanes in which such airfoils or flaps are especially close to the ground and therefore subject to damage when landing if the pilot fails to lift them at suitable times.

In the arrangement to be more particularly illustrated, separate flaps are provided and arranged to be separately operated. One pair of flaps is arranged directly beneath the fuselage. These add relatively little to the lift while adding considerably to the drag, especially when taking off when the propeller is creating a very strong air current beneath the plane. Two more flaps are arranged at the trailing edge of the wings laterally of the fuselage and add proportionately more to the lift but have less effect in increasing the drag. Accordingly, a control is provided whereby the side flaps may be operated independently of the flap or flaps directly beneath the fuselage and the central flaps can be additionally operated, or independently operated if desired, in a manner to increase the drag and to some extent also the lift when landing.

Automatic means for lifting the flaps beneath the fuselage which, in the structure herein described, project downward farther than the outer flaps, and preferably for lifting all the flaps, is arranged for control by parts first to engage the ground upon landing. According to the present invention, the flap lifting mechanism may be tripped by movement of the shock absorber of the landing gear, as by a specially provided feeler member placed forward of the flaps in position to be engaged by the ground or by movement of a hook specially provided for landing on the deck of an airplane carrier.

The invention has been developed more particularly in connection with the construction of monoplanes, although obviously adaptable to other craft, and for convenience such an airplane will be described for the purposes of illustration, it being understood, however, that the particular construction is illustrative merely.

The invention will be better understood from a description of a particular illustrative embodiment, for the purposes of which description reference should be had to the accompanying drawings forming a part hereof and in which—

Figure 1 is a perspective view of an airplane in flight showing the lift increasing and drag increasing flaps flexed downward as in landing.

Fig. 2 is a sectional view taken substantially on the line 2—2 of Fig. 1 showing one of the side flaps.

Fig. 3 is a sectional view taken substantially on the line 3—3 of Fig. 1 showing the central flap in its lower flexed position and showing the auxiliary airstream deflecting flap in substantially horizontal position.

Fig. 4 is a detail view partly in plan and partly in horizontal section through the wing and fuselage showing the flap and flap operating mechanism.

Figs. 5, 6, 7 and 8 are detail views taken respectively on the line 5—5, 6—6, 7—7 and 8—8 of Fig. 4.

Fig. 9 is a detail view of the flap flexing mechanism taken on the line 9—9 of Fig. 8, and Fig. 10 is a diagrammatic view of an actuating device connected to the landing gear.

The airplane shown in the drawings for the purposes of illustration is a low wing monoplane. The lower surface of the wings 5 is substantially flush with the lower surface of the fuselage 6. As indicated, the wings are provided with the usual ailerons 7. The ailerons are not here shown as particularly arranged to play any part in increasing the drag upon landing. Closer to the fuselage, but not extending beneath it, are provided, at the trailing edge of either wing, flaps 8 arranged to be flexed downward as indicated especially in Fig. 1, to increase the camber of the lower surface of the wings. As best shown in Fig. 2, these flaps constitute continuations of the lower surfaces of the wings but are entirely independent of the upper surfaces; that is to say, in the structure shown, and preferably, they are different in structure from ailerons in that when flexed downward they affect the effective camber of the lower wing surface with out modifying the upper wing surface.

Centrally of the wing structure and beneath the fuselage additional flaps 10 are provided. The outer flaps 8 and the central flaps 10 are arranged to be operated independently of each other. One reason for such preferred arrangement lies in the fact that when the propeller is in action, as when taking off, a strong air current or slip stream caused by the propeller flows immediately beneath the fuselage and it is not desirable to have the flaps 10 much depressed, whereas when landing with the engine shut off and the propeller substantially ineffective, the flaps 10 may be flexed to their downward position advantageously. For aerodynamic reasons the flaps 8 extending along the trailing edges of the wings to the sides of the fuselage, when flexed downward, considerably increase the lift of the wings because of the increase of the camber of the lower surfaces, without adding too much to the drag, whereas the flaps 10, if flexed downward during the take-off, would add too much to the drag in proportion to the effective increase of the lift, and hence in taking off, flaps 10 are not depressed. When landing both the flaps 8 and the flaps 10 increase the lift, though they also increase the drag, and this increase of drag is desirable rather than undesirable.

The operating arrangements for flexing the flaps downward and restoring them to normal position are best shown in Figs. 4 and 8. The flaps are all hinged to the wing structure. As shown, in Figs. 4 and 7, the flaps 8 are hinged at 11 to the wings 5 and their position is controlled by similar torque tubes 12. These tubes are mounted in brackets 13 secured to the wing structure and are connected by arms 14 and links 15 with the flaps 8 at several points in order to apply the necessary operating force to the flaps without causing undue local twisting strains. It is to be noted that the torque tubes 12 and the principal connecting and operating mechanism are located within the wing structure and within the fuselage so as not to increase the air resistance. The center flaps 10 are also pivoted to the wing structure as indicated at 17 in Fig. 6. The flaps 10 are shown as two substantially independent members to permit mounting on hinges which are at a slight angle to each other but obviously there is no controlling reason why the two flaps can not be formed as one integral structure if desired. The flaps 10 are both operated by a single torque tube 18 carried on brackets 19 secured to the wing or fuselage structure and operatively connected to the flaps 10 by arms 20 and links 21 similar to the arm and link arrangement 14, 15 of Fig. 7. The slight angularity of the hinge axes could, if desired, be sufficiently compensated for by suitable means, such as for properly adjusting the lengths of the arms 20 and the points of attachment of the links 21, but it is preferred to compensate for it by making the torque tube 18 in two sections meeting at the center line of the airplane.

The torque tubes 12 and 18 can be operated independently or inter-dependently by any suitable arrangement. In the particular structure shown, it is desired to so connect the three torque tubes that the flaps 8 are flexed downward simultaneously by the first movement of the operating mechanism and the flaps 10 are later moved downward by a further movement simultaneously with the flaps 8 after the flaps 8 have moved through an angle of about 15°. An illustrative arrangement for accomplishing this movement is shown especially in Figs. 8 and 9. An arm 22 is rigidly secured to each torque tube 12 and is connected by a link 23 to an arm 24 secured on the rock shaft or torque tube 25 to be operated thereby. The connections between the operating rock shaft 25 and the two torque tubes 12 are similar and only one need be described. The torque tube 18 may be connected to be actuated from both ends to divide the stresses if desired. The rock shaft 25 is connected through an arm 26 and a link 27 to be operated by a crank 28. The gearing connecting the crank with the link 27 may comprise a rack 30 with a pinion 31 and if desired planetary gearing or other gearing may be introduced between the crank and pinion to increase the power.

The torque tube 18 controlling the flaps 10 is operated by an arm 35 rigidly secured to the tube through a cam plate link 36 pivotally connected to arm 35. A pin 37 carried by the arm 22 operates in a slot 38 in said link. During the first part of the movement of the arm 22 from its normal position when the flaps are closed, the pin 37 rides idly in an arcuate portion 39 of the slot. When the arm 22 and the torque tube 12 have moved through an angle of about 15°, the pin 37 engages an angular portion 40 of the slot and the link 36 is moved downward by further movement of the arm 22 to disengage the pin 41 from the oblique slot 42 in the fixed bracket 43 and thereafter the arm 35 and the torque tube 18 to which it is secured move with the arm 22 and torque tube 12. During the reverse movement of the arm 22, that is to say movement to the right in Fig. 8, the two torque tubes are moved together until the pin 41 engages the slot 42 and the cam link 36 is swung to its locked position. When the cam link reaches this position, the center flaps 10 are in closed position and further movement closes the flaps 8.

The shape of the slot 38 and the arrangement of parts may vary somewhat and yet effect the above operation. The arcuate portion 39 is formed on an arc about the center of the torque tube 18 in order to permit the idle relative movement desired as above mentioned and the angular portion 40 is of such shape that the movement of the pin 37 against the lower surface of the slot will readily force the link downward to move the pin 41 downward and out of the slot 42. The upper surface of the portion 40 of the slot lies at such an angle, substantially perpendicular to the radius from the pivot point of the link 36, that upon movement of the arm 22 in the opposite direction, the pin 37 will not slip from its operative lifting position. A spring 36¹ may be carried by the arm 35 and arranged to urge the link 36 downward to aid the operation described.

Under certain conditions there may be a considerable resistance to the deflecting of the flap 10 downward. In order to overcome this resistance and to facilitate the operation the flaps are provided with trailing blades or tabs 45 and suitable connected links are arranged to tilt these tabs to an angle as indicated in Fig. 3, such that the air flow will provide a pressure thereagainst which will exert a pressure downward on the flaps 10. As shown, the tabs 45 are pivoted at 46 to brackets 47 rigidly secured to the flaps 10. The tabs 45 are moved about the supporting pivots 46 by a link mechanism comprising the link 49 connected to a bracket 50 on the tab 45 and connected at its other end to a rocking plate 51 pivoted to the flap 10 at 52. A second link 53 connects the plate 51 to an arm 54 on the torque tube 18. When the flap 10 moves downward about the pivot 17 as the result of the rocking of the torque tube 18, the forward edge of the tab 45 will move downward far enough so that the current of air along the lower surface of the flap 10 will engage the upper surface of the tab 45 and exert the desired pressure thereon. The tabs may be streamlined as shown in the drawing.

This arrangement referred to specifically in connection with the purpose of making it easy for the pilot to flex the flap 10 downward, is also provided for the purpose of dealing with the air leaving the trailing edges of the opened flaps, which air has a quite turbulent, uneven nonstreamline flow, quite often continuing rearwardly past the tail surfaces, and adversely affecting the controllability of the aircraft. The tabs being located behind and below the trailing-edge of the flaps, at an angle approaching that at which the air normally takes in flowing past the aircraft, and each tab defining a slot between itself and the flap, the air leaving the flaps flows both above and below the tabs. It has been found that this sets up a flow tending to relieve turbulence to such an extent as to give a smooth, stable flow over the empennage and provides stable controllability.

It is contemplated by the present invention to also provide these tabs and tab-arrangements on elevators, rudder, and ailerons, if desired.

In further accordance with the invention, the flap operating mechanism is so arranged that the flaps can be released automatically upon landing to permit upward movement to safe position. Furthermore, spring means preferably is provided to raise the flaps when any of several feeler mechanisms is actuated upon landing. The arrangements are the same between both torque tubes 12 and the torque tube 25. One will be described. As shown, each operating arm 24 connected to the link 23 is loosely mounted on the torque tube 25 and it is operated through an arm 55 which is keyed to the torque tube and releasably connected to the arm 24 by pin 56 carried by the arm 24 and spring pressed radially inward to engage a notch 58 in the arm 55. Withdrawal of the pin 56 radially outward releases the connection between the arm 24 and the arm 55 and therefore the connection with the torque tube 25. The flaps 8 and 10 are therefore entirely free for immediate upward movement. In order that these flaps may be lifted a spring 60 is connected to the arm 24 and to a fixed part of the wing structure. This spring is tensioned by the flap operating mechanism when moving the flaps down and therefore is immediately operative to lift the flaps when the connection between the arms 24 and 55 is released.

The end of arm 55 is so shaped, as shown, that when the flaps and the operating mechanism for the flaps are returned to the closed position upon the craft's touching a landing surface, pin 56 automatically slides into slot 58, thus again connecting the flaps to crank 28 and putting the mechanism again into condition for opening the flaps for the take-off. Any suitable arrangements may be provided for releasing the pin 56 from the slot 58. As diagrammatically shown, a flexible push-pull or Bowden wire 61 is connected to the arm 24 in such position that upon operation it will engage a shoulder 62 on the pin 56 to move the same radially outward and release it. At the opposite end the Bowden wire is secured to a suitable bracket, not shown, in the fuselage in position to be operated by any one of several triggering devices. To this end a pivoted arm 64 is operatively connected to the flexible push-pull device and this arm in turn is positioned to be operated by several actuating devices which are actuated from suitable feeler devices or the like.

One feeler device is shown diagrammatically as in the form of a series of rods 65 pivoted at 66 and depending from the wing and fuselage forward of the flaps 8 and 10 in position to engage any obstruction high enough to be hit by the flaps. Rearward movement of any rod closes an electrical contact through a solenoid 67 to move the arm 64. Electrical contacts 68 and 69 carried by the relatively movable parts of the shock absorber 70 of the landing gear are arranged to close the circuit and operate a solenoid 71 positioned also to operate the pivoted arm 64.

Still another actuating device is arranged to be actuated by the hook 73 carried by the craft in position to engage a retarding device on the deck of a naval aircraft carrier. As shown diagrammatically rearward movement of the hook will close a circuit through the electrical contacts 74, 75 and solenoid 76 to actuate the arm 64.

Instead of the three separate solenoids 67, 71 and 76, a single solenoid may be employed, with a wiring circuit from it to each feeler device 65, 70, and 73; or, if desired, shaft 61 may be omitted and a solenoid may be mounted directly on shaft 24, with a circuit to each feeler, 65, 70 and 73.

The particular structure and arrangement shown and described illustrate the principles of the invention but it is to be understood that the particular description is merely illustrative and that numerous variations and other embodiments may be developed without departing from the principles of the invention.

I claim:

1. In an airplane a flap for changing the camber of the lower surface of a part of the airplane, means for positively lowering the flap from the fuselage and including a rock shaft, a torque-tube, an arm loosely mounted on the rock shaft, a releasable detent connecting the arm to said shaft, a spring connected to the arm in such manner as to automatically rock the shaft in the flap-lifting direction when the detent is released, a Bowden wire connected to the detent, an actuating member connected to the Bowden wire, and a feeler member operatively connected to the actuating member and adapted to actuate same when the feeler contacts a landing surface.

2. An airplane for operation from an aircraft-carrier having arresting members on its flying deck, and including a split trailing-edge flap of the type that would contact said arresting members on landing, means for lifting said flap, an extensible arresting hook on the aft-portion of the airplane, an electrical terminal on the said arresting-member, a complementary terminal on its mounting, and an electrical circuit between the terminals, and including means for actuating the flap-lifting means.

ALEXANDER P. DE SEVERSKY.